(12) United States Patent
Farouki

(10) Patent No.: US 8,185,826 B2
(45) Date of Patent: May 22, 2012

(54) RENDERING DOCUMENT VIEWS WITH SUPPLEMENTAL INFORMATION CONTENT

(75) Inventor: Karim Taji Farouki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 11/606,554

(22) Filed: Nov. 30, 2006

(65) Prior Publication Data

US 2008/0134083 A1    Jun. 5, 2008

(51) Int. Cl.
*G06F 3/00* (2006.01)
(52) U.S. Cl. ......... 715/751; 715/781; 715/798; 715/800
(58) Field of Classification Search .................. 715/751, 715/781, 798, 800
See application file for complete search history.

(56) References Cited

U.S. PATENT DOCUMENTS

| | | | |
|---|---|---|---|
| 596,970 | A | 10/1999 | Tanimoto et al. |
| 6,195,094 | B1 * | 2/2001 | Celebiler ...................... 715/764 |
| 627,184 | A1 | 8/2001 | Finseth et al. |
| 646,620 | A1 | 10/2002 | Van Ee |
| 6,954,897 | B1 * | 10/2005 | Noguchi et al. ............... 715/234 |
| 7,010,751 | B2 * | 3/2006 | Shneiderman ................. 715/232 |
| 7,343,552 | B2 * | 3/2008 | Denoue et al. ................. 715/205 |
| 7,375,732 | B2 * | 5/2008 | Aguera Y Arcas ............ 345/666 |
| 2002/0011990 | A1 | 1/2002 | Anwar |
| 2002/0016828 | A1 | 2/2002 | Daugherty et al. |
| 2003/0081000 | A1 * | 5/2003 | Watanabe et al. ............. 345/751 |
| 2003/0090510 | A1 | 5/2003 | Shuping et al. |
| 2004/0059708 | A1 | 3/2004 | Dean et al. |
| 2004/0080531 | A1 | 4/2004 | Berstis |
| 2004/0205542 | A1 * | 10/2004 | Bargeron et al. .............. 715/512 |
| 2005/0022136 | A1 * | 1/2005 | Hatscher et al. ............... 715/798 |
| 2005/0038770 | A1 | 2/2005 | Kuchinsky et al. |
| 2005/0060664 | A1 * | 3/2005 | Rogers .......................... 715/810 |
| 2005/0183005 | A1 | 8/2005 | Denoue et al. |
| 2006/0015810 | A1 | 1/2006 | Calvert et al. |
| 2006/0053365 | A1 * | 3/2006 | Hollander et al. ............. 715/512 |
| 2006/0053411 | A1 | 3/2006 | Takamiya |
| 2006/0064647 | A1 * | 3/2006 | Tapuska et al. ............... 715/800 |
| 2006/0074751 | A1 | 4/2006 | Kline et al. |
| 2006/0106710 | A1 | 5/2006 | Meek et al. |
| 2006/0123015 | A1 | 6/2006 | Solyanik et al. |
| 2006/0143697 | A1 | 6/2006 | Badenell et al. |

(Continued)

FOREIGN PATENT DOCUMENTS

EP    1681653 A1    7/2006

OTHER PUBLICATIONS

Chinese Official Action dated Sep. 21, 2010 in Chinese Application No. 200780044302.7.

(Continued)

*Primary Examiner* — Michael Roswell
(74) *Attorney, Agent, or Firm* — Hope Baldauff Hartman, LLC

(57) ABSTRACT

Methods and computer-readable media are provided for rendering a document view with supplemental information. A view of a document is rendered such that the document fills a canvas. The client receives a request to view a supplemental information area associated with the document. In response to the request to view the supplemental information area, a view of the document is rendered at the client such that the document does not fill the canvas. The supplemental information area is then rendered in a portion of the canvas that is not occupied by the document.

20 Claims, 6 Drawing Sheets

U.S. PATENT DOCUMENTS

2006/0184400 A1    8/2006   Rao et al.

OTHER PUBLICATIONS

Australian Official Action dated Jul. 4, 2011 in Australian Application No. 2007325055.
Chinese Official Action dated Mar. 15, 2011 in Chinese Application No. 200780044302.7.
International Search Report dated May 13, 2008 in International Application No. PCT/US2007/085984.
Halaschek-Weiner et al., "Image Annotation on the Semantic Web," Working draft of Multimedia Annotation in the Sematic Web Task Force of the W3C Semantic Web Best Practices & Deployment Working Group, downloaded Sep. 8, 2006 from http://www.w3.org/swbp-image-annotation, 33 pages.
Zhao et al., "What's Happening?: Promoting Community Awareness through Opportunistic, Peripheral Interfaces," 2002, Proceedings of the Working Conference on Advanced Visual Interfaces (AVI '02), pp. 69-74.
Chinese Official Action dated Nov. 24, 2011 in Chinese Application No. 200780044302.7.
Wiener et al., "Image Annotation on the Semantic Web", Date: 2006, http://www.w3.org/TR/swbp-image-annotation/.

* cited by examiner http://www.webpage.com

Lorem ipsum dolor sit amet, consectetuer adipiscing elit. Cras sed sapien eu dui aliquam rutrum. Praesent nec dui. Donec urna eros, bibendum quis, lacinia sed, vestibulum scelerisque, risus. Morbi lectus lacus, tristique eu, adipiscing eget, sagittis non, ipsum. In hac habitasse platea dictumst. Morbi rutrum. Pellentesque mollis dui et erat. Vivamus tincidunt, purus in accumsan viverra, nisl orci faucibus libero, ut scelerisque ligula risus quis sapien. Sed interdum eros sit amet quam. Sed rhoncus cursus urna. Duis sed purus nec metus rutrum tempus.

ac eros. Nulla sit amet nulla.

Quisque velit purus, venenatis eget, scelerisque vitae, cursus non, odio. Cras quis elit. Etiam nec eros sit amet elit accumsan venenatis. Nulla facilisi. Praesent fringilla elit sit amet tellus. Donec vitae tellus dictum dolor pulvinar dapibus. Aliquam placerat laoreet neque. Duis vel metus. Phasellus faucibus. Sed condimentum mi sit amet odio. Morbi condimentum. Pellentesque malesuada nisl ut enim. Quisque gravida fermentum enim. Etiam malesuada sem sit amet ipsum. Fusce non pede.

Quisque gravida tortor et diam. Mauris et orci. Sed sit amet tortor ut sapien convallis mollis. Cras mattis eros id lorem. Curabitur ut dui. Quisque placerat. Nunc lectus felis, feugiat nec, blandit blandit, lacinia nec, nisi. Nunc sit amet enim quis justo ullamcorper elementum.

IMAGE

Nulla lorem. Curabitur cursus posuere quam. Vestibulum pharetra. Phasellus vel felis ultrices nunc aliquet molestie.

*Fig.1.*

RENDERING DOCUMENT VIEWS WITH SUPPLEMENTAL INFORMATION CONTENT

BACKGROUND

People utilize personal computers ("PCs") in their daily lives to access, create, and manipulate many different types of information. For example, people commonly access information contained in World Wide Web ("Web") pages stored on the Internet. People also regularly create, view, and manipulate other types of documents, such as word processing documents, spreadsheets, databases, computerized presentations, photographs, movies, and other images and media.

After accessing information and viewing it on a computer display, users are often able to perform various actions with respect to the information and any documents containing the information. For example, using one or more input devices such as a keyboard and a computer mouse, a user may add or delete information from a document and alter the appearance, configuration, and layout of the information within the document. The user may choose to zoom in or out of the document so that more or less of the information within the document is viewable at a given time according to the characteristics of the computer display on which the document is being viewed.

If the user desires to take notes relating to the document or add comments or other annotations to the document, either for personal use or to share with another user, she currently has several options. First, the user may insert comments or other annotations within the document itself if the document allows for editing. For example, the user may add comments within a word processing document using a color, font, highlighting, capitalization, or any other method for distinguishing the comments from the information itself. However, doing so requires that changes be made to the underlying document.

Another option for taking notes or annotating the document is to utilize a separate application program or document. For example, the user may create a separate document in the same or different application in which to draft notes and comments. However, doing so requires at least two documents, the original document and the document containing the notes and comments. This can be cumbersome and creates an opportunity for inadvertent separation of the two documents.

It is with respect to these considerations and others that the disclosure made herein is provided.

SUMMARY

Methods and computer-readable media are provided herein for rendering document views with supplemental informational content without leaving the context of a document. As described herein, document views may be altered so as to provide a document view along with supplemental information that may include user annotations, community annotations, and/or contextual advertising.

According to one aspect presented herein, a view of a document is rendered such that the document fills a canvas. A request to view a supplemental information area associated with the document may also be received. In response to receiving such a request, a view of the document is rendered in a manner in which the document does not fill the canvas. The supplemental information area is then rendered in a portion of the canvas that is not occupied by the document. According to various aspects, the supplemental information area may be used to display user annotations created, community annotations, and/or contextual advertising.

User annotations may include information associated with the document that is created by a user and is accessible to that user upon requesting to view the supplemental information area. Community annotations may include information associated with the document that is created by a user and is accessible to other users viewing the supplemental information area. Contextual advertising may include advertisements that are targeted to a user according to the informational content of the document, as well as according to information associated with the user.

According to various aspects presented herein, rendering the view of the document in a manner in which the document does not fill the canvas may include fluidly reducing the size of the document from the size of the canvas to a size smaller than the canvas. Additionally, according to aspects presented herein, a request may be received to conceal the view of the supplemental information area associated with the document, and as a result, the view of the document may be rendered such that the document fills the canvas. Rendering the document such that the document fills the canvas may include fluidly increasing the size of the document from a size smaller than the canvas to the size of the canvas or larger.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is an illustrative user interface diagram showing a document view wherein a document fills a canvas according to one embodiment presented herein;

DETAILED DESCRIPTION

Figure 2:
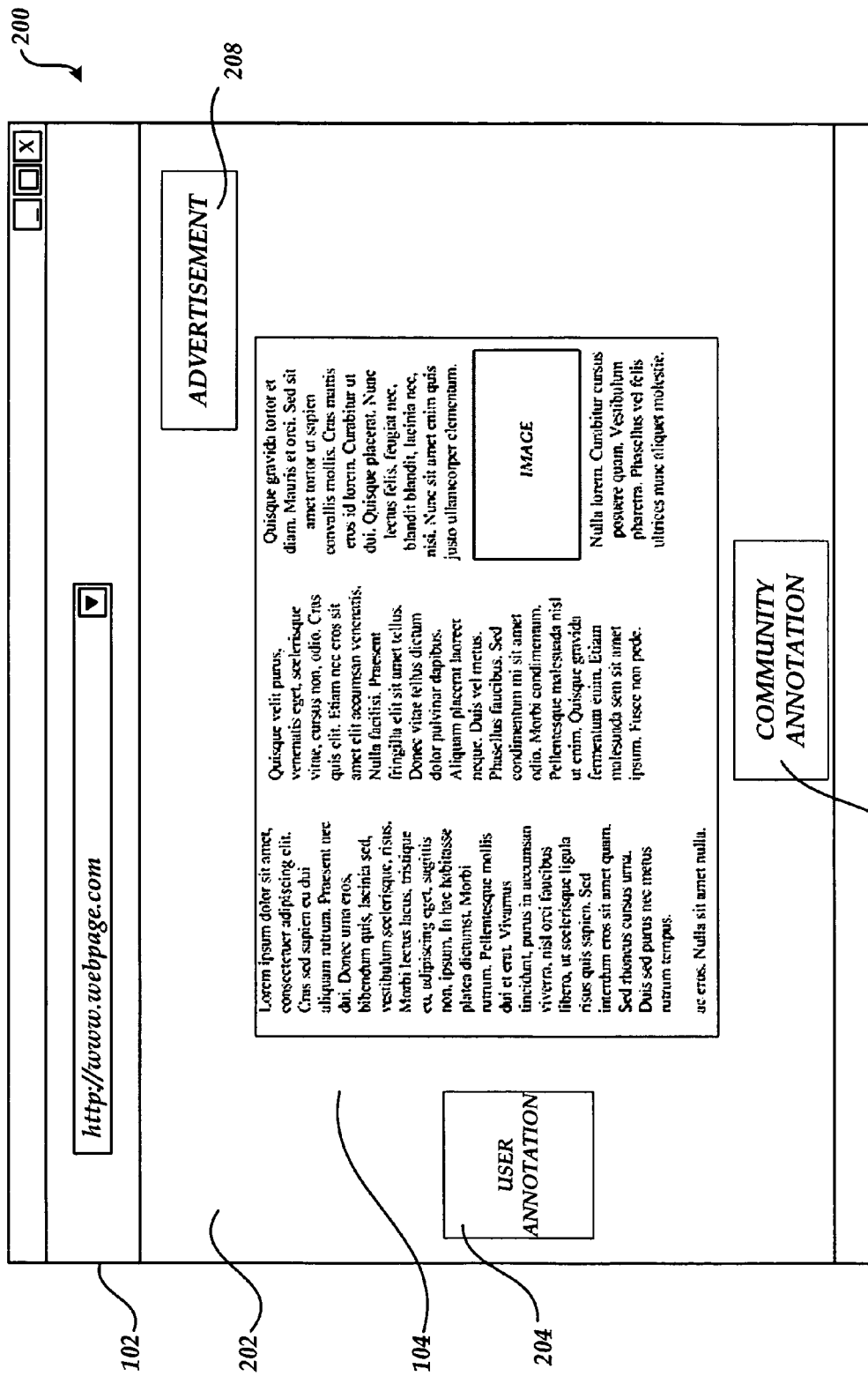
FIG. 2 is an illustrative user interface diagram showing a document view occupying a portion of a canvas along with a supplemental information area occupying another portion of the canvas according to one embodiment presented herein.

The following detailed description is directed to methods, and computer-readable media for rendering a document view with supplemental information. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Implementations of the disclosure presented herein allow users to fluidly zoom in and out of a document and to create and view annotations in a supplemental information area surrounding the zoomed-out document. By creating annotations in an area surrounding the document rather than within the document, the user can control when and if they choose to view the annotations by zooming in and out using a mouse wheel or other user input device. As the user zooms out, any related annotations surrounding the document enter into view as the document gets smaller in the viewing window of the computer display. As the user zooms in, the annotations recede from view as the document fills the viewing window. The annotations may be made by the user or by others and shared between designated parties. Additionally, contextual advertising may be placed within the supplemental information area that targets users based on the content of the document, user information stored within a user profile, or any combination thereof.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of the disclosure presented herein for rendering a document view with supplemental information will be described.

FIG. 1 shows illustrative user interface 100 that includes a viewing window 102 and corresponding document view 104. Although the document view 104 fills the window 102 in FIG. 1, it should be appreciated that the window 102 may or may not fill the viewable area of a computer display screen. In the embodiment shown in FIG. 1 and described herein, the document being displayed is a Web page. It should be appreciated, however, that embodiments described herein are not limited to the display of a Web page and that any type of document may be utilized. As used herein, the term document refers any file, the contents of which may be displayed for a user, such as but not limited to Web pages, word processing documents, spreadsheets, multimedia files, presentations, and drawings.

As also shown in FIG. 1, a document may be rendered on a canvas within a viewing window. A canvas may include an entire portion of a viewing window where a document is rendered. As a document view 104 is zoomed in and out, increasing and decreasing the size of the document view 104, the size of the underlying canvas remains static. Zooming refers to the process of altering the size of the document view 104 with respect to the canvas. Zooming in increases the size of the document view 104 such that the document appears to grow larger. Conversely, zooming out decreases the size of the document view 104 such that the document appears to become smaller.

FIG. 2 shows an illustrative user interface 200 that includes the viewing window 102 and the document view 104. In the example user interface 200 shown in FIG. 2, a user has zoomed out from the document view 104 shown in FIG. 1 to reveal a supplemental information area 202. As described herein, the supplemental information area 202 is a portion of the canvas outside of the document view 104 that is viewable upon zooming out from the document view 104. As described in detail herein, the supplemental information area 202 may be utilized to display supplemental information corresponding to information within the document view 104 or other types of content.

In one implementation, the supplemental information area 202 is utilized to display a user annotation 204. The user annotation 204 may include information associated with the document that is created by a user and is accessible to the user upon rendering a view of the supplemental information area 202. The user annotation may be created when the user is viewing the supplemental information area 202. According to one implementation, when viewing the supplemental information area 202, the user may use a mouse or other user input device to select a portion of the supplemental information area 202 where the user annotation 204 should be created. After selecting the desired location of the user annotation 204, the user is provided with a user interface for providing the text of the annotation or to insert a picture or other media. After creating the user annotation 204, the annotation is stored on a client computer as described below with respect to FIG. 3.

In another implementation, the supplemental information area 202 may be used to display a community annotation 206. The community annotation 206 may include information associated with the document that is created by a user and accessible to one or more other users. As will be described below with respect to FIG. 3, the community annotations 206 may be stored on a remote server accessible to a computer network.

When a community annotation 206 is created, the user may specify whether the annotation should be made available to other users. For instance, a user may choose to allow any other user to view the community annotation 206, or may select the users that are authorized to view the community annotation 206. In this manner, a user may create a general comment in the supplemental information area 202 of a document view 104 that is viewable by anyone that views the contents of the document. Similarly, the user may create a comment in the supplemental information area 202 that is directed to a specific person or group of people viewing the document content.

According to other implementations, the supplemental information area 202 may be used to display one or more contextual advertisement 208 relating to the information within the document view 104 and/or related to the user viewing the supplemental information area 202. It should be understood that the supplemental information area 202 may include any number, type, and combination of user annotations 204, community annotations 206, advertisements 208, and other information relevant to the contents of the displayed document.

As the user zooms in and out of the document view 104, the supplemental information area 202 containing any applicable user annotations 204, community annotations 206, and advertisements 208 may be concealed or viewed as desired. Additionally, implementations presented herein provide for fluid, continuous zooming between a document view 104 that fills the canvas and a document view 104 that exposes the supplemental information area 202 of the canvas. The fluid, continuous transitions between views allows for an enhanced viewer experience, encouraging the use of the supplemental information area 202.

Figure 3:
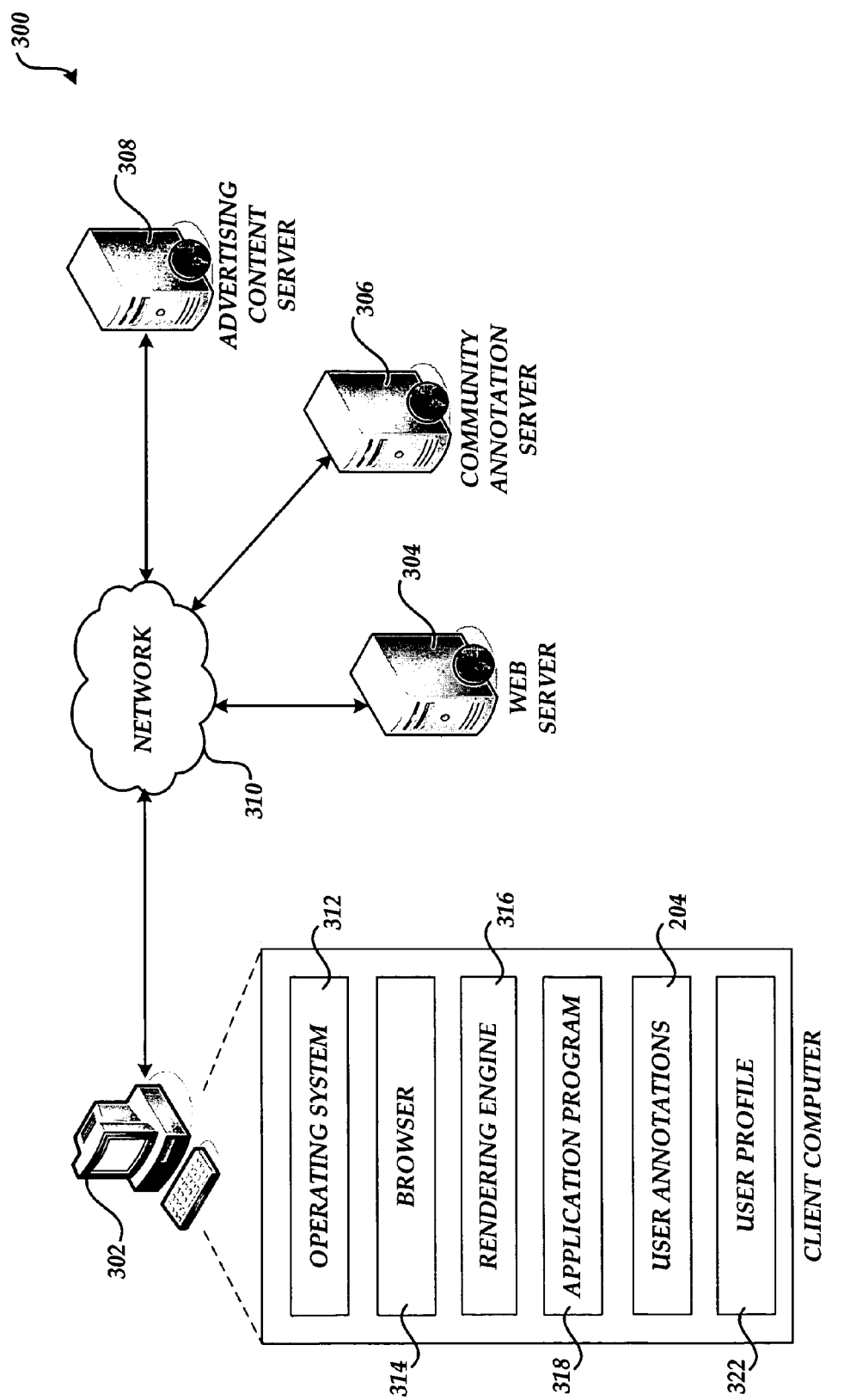
FIG. 3 is a network and client computer diagram showing an illustrative operating environment for the processes and computer systems described herein and several of the software and data components utilized by the computer systems described herein.

Turning now to FIG. 3, a network diagram will be described illustrating aspects of an illustrative operative environment 300 for the subject matter presented herein that includes a client computer 302, a network 310, a Web server computer 304, a community annotation server 306, and an advertising content server 308. As shown in FIG. 3, the client computer 302 and the remote server computers 304, 306, and 308 are communicatively coupled to one another through respective connections to the network 310. According to one implementation, the network 310 comprises the Internet. However, it should be appreciated that the network 310 may comprise a LAN, WAN, or other type of suitable network for connecting the client computer 302 and the remote server computers 304, 306, and 308.

FIG. 3 also illustrates a number of software components utilized by the client computer 302. In particular, the client computer 302 includes an operating system 312 suitable for controlling the operation of a networked desktop or laptop computer. According to implementations, the client computer 302 may utilize the WINDOWS XP or WINDOWS VISTA operating systems from MICROSOFT CORPORATION of Redmond, Wash. Other operating systems, such as the LINUX operating system or the OSX operating system from APPLE COMPUTER, INC. may also be utilized. It should be appreciated that although the embodiments presented herein are described in the context of a desktop or laptop client computer 302 and remote server computers 304, 306, and 308, many other types of computing devices and systems may be utilized to embody the various aspects presented herein.

According to one implementation, the client computer 302 also includes a Web browser program (referred to herein as a "browser") 314 such as the INTERNET EXPLORER Web browser from MICROSOFT CORPORATION of Redmond, Wash. The browser 314 is operative to request, receive, and display documents, such as Web pages, from the Web server computer 304. The client computer 302 also includes a rendering engine 316 capable of rendering hypertext markup language ("HTML") pages and other types of markup pages into a visual representation. The browser 314 and other applications on the client computer 302 may utilize the rendering engine 316 to render pages and other data received from computers via the network 310. In this manner, the rendering engine 316 may be utilized to provide a visual representation of Web pages or other types of document views 104. It should also be understood that the rendering engine 316 may be a component of the browser 314, may be a component of the operating system 312, or may be a separate component altogether.

As will be described in detail below, the browser 314 utilizes the rendering engine 316 to render a document view 104 on a canvas, receives user requests to zoom out of a document view to expose the supplemental information area 202 on a portion of the canvas, retrieves supplemental information when applicable, and renders a document view 104 that includes the supplemental information area 202 of the canvas and any retrieved supplemental information. The browser 314 communicates with the community annotation server 306 and the advertising content server 308 via the network 310 to retrieve applicable community annotations 206 and contextual advertising 208.

According to implementations presented herein, the rendering engine 316 is operative to fluidly zoom in and out of a document view 104. This continuous, fluid zooming capability contrasts the discrete zooming capabilities of traditional application programs. In existing applications, the transition between document views having different resolutions is not fluid in that the existing view is erased, followed by a rendering of the document at the requested resolution, resulting in a hesitation as the view transitions.

In contrast, the disclosure presented herein utilizes algorithms that allow for fluid and continuous transitions between document views by extrapolating between stored document resolutions to arrive at the requested document resolution in a fluid, continuous manner. The amount of data transferred to the rendering engine from the requested document resolution is proportional to the resolution of the display screen on which the document is to be rendered and includes the differences between the existing document resolution and the requested document resolution. This process is described in U.S. Pat. No. 7,075,535, filed Mar. 1, 2004 and entitled "System and Method for Exact Rendering in a Zooming User Interface," which is herein incorporated by reference in its entirety.

In one embodiment, the client computer 302 may additionally include one or more application programs 318 such as a word processing program or a spreadsheet program. As discussed above, the disclosure presented herein is equally applicable to a word processing document or a spreadsheet as it is to a Web page. Using the disclosure presented herein, a user may zoom out of a word processing document to reveal or insert supplemental information into the supplemental information area 202 surrounding the document.

According to aspects presented herein, the client computer 302 may store user annotations 204. The user annotations 204 may include any notes, comments, questions, reminders, or other text that the user may wish to add to the supplemental information area 202. Upon detecting a request from the user to zoom out of a document view 104, the rendering engine 316 searches the client computer 302 for any user annotations 204. The rendering engine 316 may utilize a uniform resource locator ("URL") or other identifier corresponding to the document view 104 along with a hash algorithm and a hash table in order to index and locate user annotations stored on the client computer 302.

Alternatively, the user annotations 204 may be stored on the community annotation server 306 or other remote server computer, allowing the user to access the user annotations 204 while using any client computer 302 that is connected to the network 310. Storing and locating the user annotations 204 on a remote server computer occurs in a similar manner as storing and locating the user annotations 204 on the client computer 302. The browser 314 may utilize a URL or other identifier corresponding to the document view 104 along with a hash algorithm and table to index and locate user annotations on the community annotation server 306 or other remote server computer.

The rendering engine 316 may additionally provide a user interface to the user for receiving user annotations 204. Upon detecting a request to zoom out of a document view 104, the rendering engine 316 may not only retrieve all applicable supplemental information relating to the document, but also provide the user with the user interface for inserting additional user annotations 204 for storing on the client computer 302 or for storing on the community annotation server 306 for sharing as a community annotation as described below.

According to one implementation, the client computer 302 includes a user profile 322 for storing information associated with the user. The browser 314 transfers some or all of this information to the advertising content server 308 for selection of advertisements that are targeted to the user for rendering in the supplemental information area 202. It should be understood that the information stored within the user profile 322 may include demographic information, geographic location information, purchasing trend information, and any other information that allows for advertisements to be selected for a targeted consumer or consumer category.

The community annotation server 306 stores community annotations that may be viewed by any individuals or by a select group of individuals having the proper authorization. When a user creates an annotation, the user may be provided with options in the user interface that allow the user to choose whether she would like to share the annotation. If the annotation is not to be shared, then the annotation is stored on the client computer 302 as described above. If the annotation is to be shared, then the user is given the option to select the parties with which she would like to give access to the annotation, or she may choose to allow anyone to view the annotation.

Once the selections have been made allowing the annotation to be shared with one or more parties, the community annotation is stored on the community annotation server 306 along with a descriptor that identifies the parties that are allowed access. As will be described in detail below, when the user zooms out of a document view in order to view any community annotations within the supplemental information area 202, any community annotations that the user has the proper permission to view will be displayed.

The advertising content server 308 stores advertising content for placement within the supplemental information area 202 when applicable. It should be appreciated that the advertising content can include graphics, text, video, audio, or any other type of media. When the user zooms out of a document view in order to view the supplemental information area 202 and any corresponding supplemental information, contextual advertising stored at the advertising content server 308 may be retrieved and displayed. Upon detecting a request to view the supplemental information area 202, the browser 314 will send a URL corresponding to the document view 104 or other document identifier along with user information stored in the user profile 322 to the advertising content server 308. The advertising content server 308 retrieves the document, analyzes the content, and utilizes the content along with the user information to select one or more appropriate advertisements. As an example, an application stored and executed at the advertising content server 308 may be operative to search for keywords or brand names within the document.

Figure 4A:
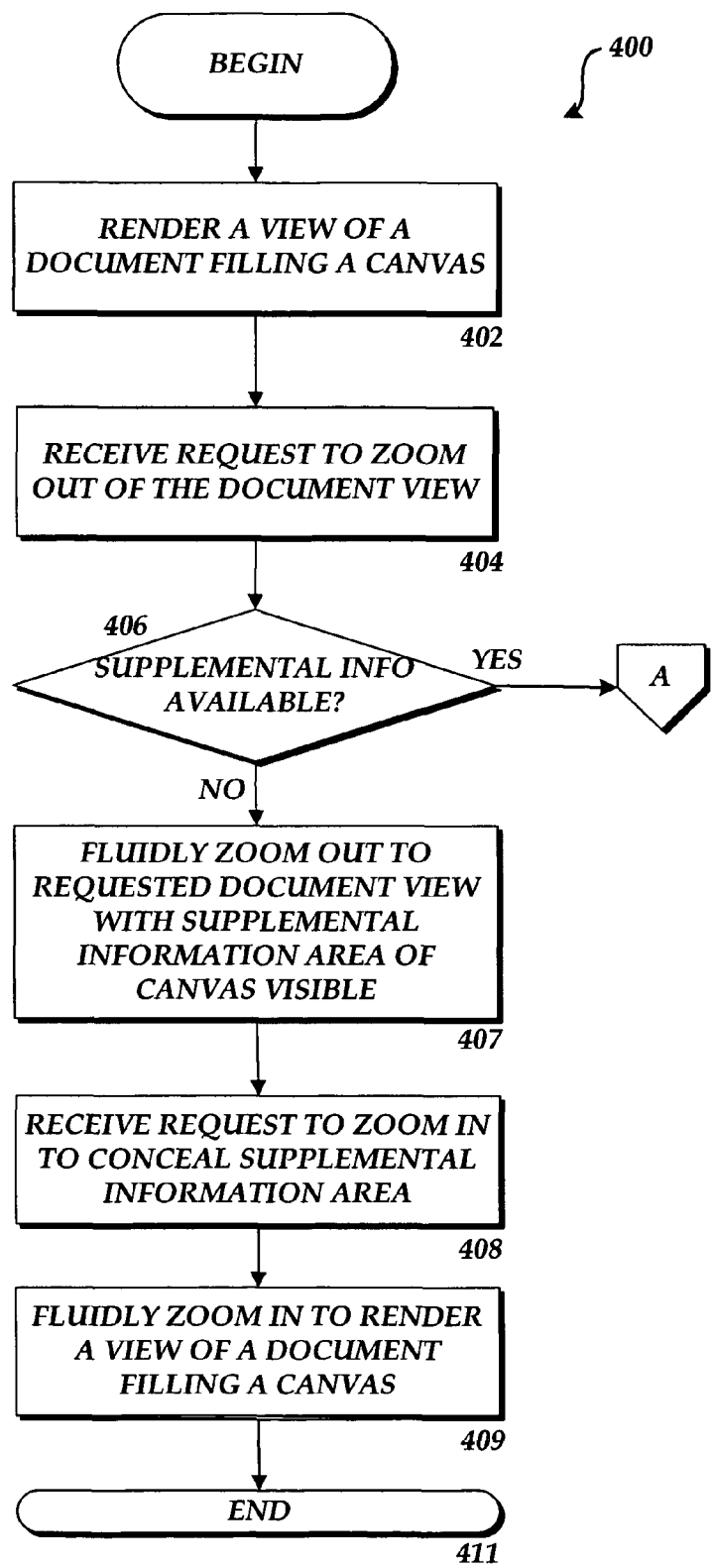
FIGS. 4A and 4B are flow diagrams illustrating one method for rendering a document view according to one embodiment presented herein.
Figure 4B:
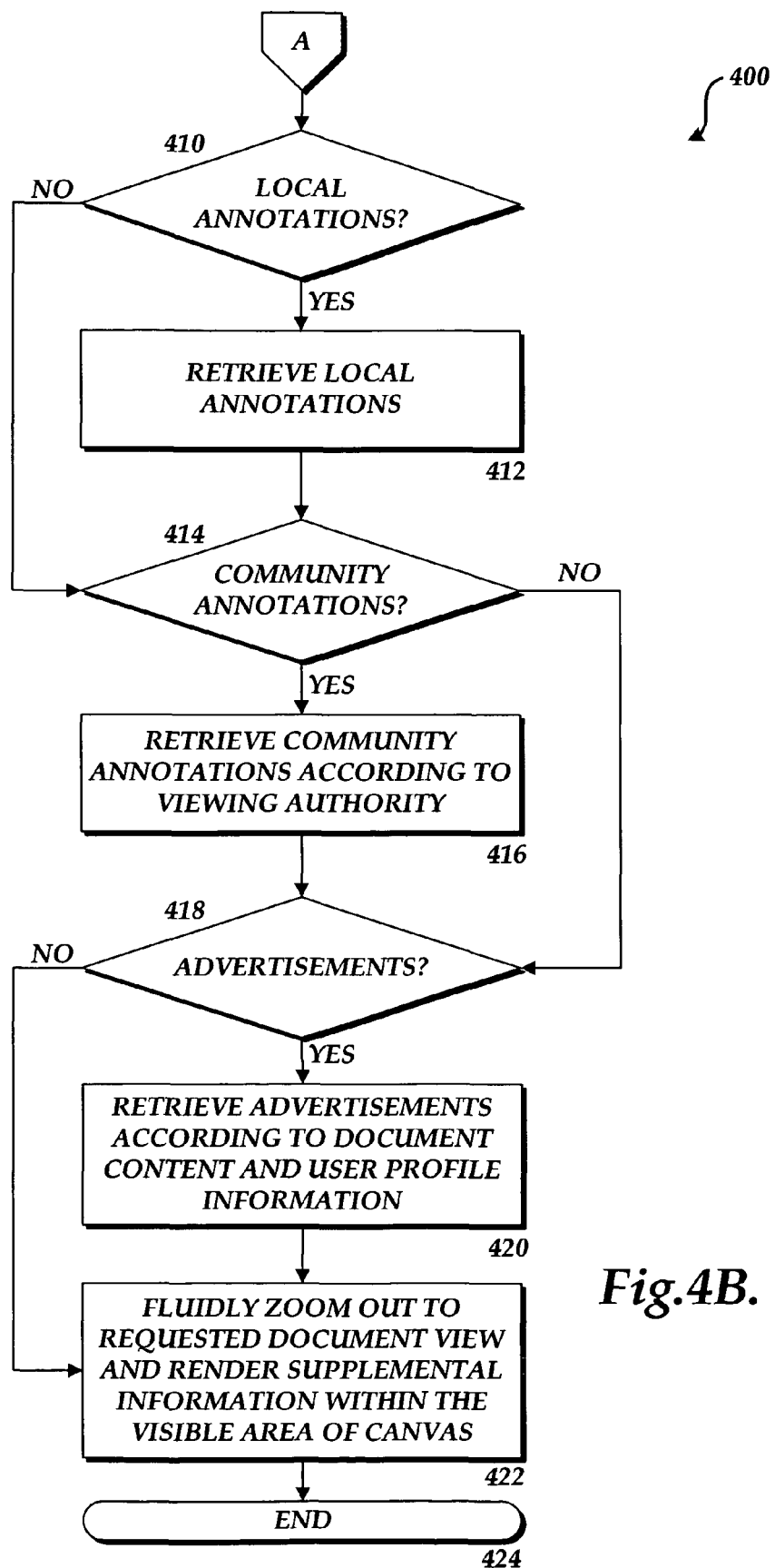

Referring now to FIGS. 4A and 4B, additional details will be provided regarding the embodiments presented herein for rendering a document view 104 with supplemental information. In particular, FIGS. 4A and 4B are flow diagrams illustrating the operation of the client computer 302, in conjunction with the community annotation server 306 and the advertising content server 308 according to one implementation.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at operation 402, where the rendering engine 316 renders a document view 104 thereby completely filling the canvas. As discussed briefly above, the rendering engine 316 renders a document view 104 on top of a canvas. According to implementations presented herein, a portion of that canvas becomes the supplemental information area 202 when the rendering engine 316 zooms out of the document view 104. When zooming out, the rendering engine 316 reduces the size of the document view 104, while the canvas size remains constant, thereby filling the viewing window of a display on the client computer 302.

From operation 402, the routine 400 continues to operation 404, where the rendering engine 316 receives a request to zoom out of the document view 104. Such a request may be received from a user input device such as from the activation of a scroll wheel on a computer mouse or the input of a key or key combination on a keyboard. In response to receiving the request, the routine 400 proceeds from operation 404 to operation 406, where a determination is made as to whether supplemental information is available for display in the supplemental information area 202.

To determine whether supplemental information is available for display in the supplemental information area 202, the browser 314 checks for any user annotations stored on the client computer 302 that relate to a URL associated with the document view 104 or other document identifier. The browser 314 may additionally query the community annotation server 306 with the URL associated with the document view 104 or other document identifier to determine whether any community annotations relating to the document, or user annotations stored remotely for user access from any client computer connected to the network 310, are stored within the community annotation server or in a corresponding database.

Finally, the browser 314 queries the advertising content server 308 with the document URL or other document identifier and any user information from the user profile 322 to request any targeted advertisements relating to the document and/or the user for placement within the supplemental information area 202. It should be understood that the query from the browser 314 to the advertising content server 308 may include document content information extracted from the document by the browser 314, or may include an identifier that allows the advertising content server 308 to access the document to analyze its contents for information with which to select targeted advertisements.

Alternatively, the query from the browser 314 may not include any document content information or means for accessing the document and may include only user information for selecting advertisements according to user characteristics. According to further embodiments, the query from the browser 314 to the advertisement content server may include any other criteria for selecting targeted advertisements or may not include any information or criteria for selecting advertisements, thereby allowing random advertisements to be selected and placed within the supplemental information area 202. A user may also be given the choice to opt-out of all advertisements within the supplemental information area 202.

If, at operation 406, the browser 314 determines that there is supplemental information available, being one or more user annotations, community annotations, advertisements, or any combination thereof, then the routine 400 proceeds to operation 410, which will be described below. However, if at operation 406, the browser 314 determines that there is no supplemental information available, then the routine continues to operation 407.

At operation 407, the rendering engine 316 fluidly zooms out of the document view 104 in which none of the canvas is visible to a document view 104 in which the supplemental information area 202 of the canvas is visible. As described above, according to one implementation, this zooming action occurs fluidly and continuously so that there is no visible hesitation during the zooming process as the requested zoom level loads and is rendered. From operation 407, the routine 400 continues to operation 408, where the rendering engine 316 receives a request to zoom in to conceal the supplemental information area 202. The routine 400 continues to operation 409, where the rendering engine 316 fluidly zooms in to render a document view 104 that fills the canvas and the routine 400 ends.

Returning to operation 406, if the browser 314 determines that there is supplemental information available, then the routine 400 continues to operation 410, where the browser 314 determines whether the available supplemental information includes local user annotations 204. If the browser 314 determines that the supplemental information includes local user annotations 204, then the browser 314 retrieves those annotations at operation 412 before proceeding to operation 414. However, if the browser 314 determines at operation 410 that the supplemental information does not include local user annotations 204, then the routing 400 proceeds to operation 414, where the browser 314 determines whether the available supplemental information includes community annotations.

If the browser 314 determines that the supplemental information includes community annotations, then the browser 314 selects and retrieves those community annotations at operation 416 according to viewing authority before proceeding to operation 418. As described above, when saving community annotations at the community annotation server 306, the user may choose the community to which the annotations will be accessible. The user may choose to allow anyone to view the community annotations or to allow a specified one or more persons to view the community annotations. If at operation 414, the browser 314 determines that the available supplemental information does not include community annotations, then the routine 400 proceeds to operation 418, where the browser 314 determines whether the available supplemental information includes advertisements.

If the browser 314 determines that the supplemental information includes advertisements, then the browser 314 retrieves the advertisements at operation 420 according to the content of the document and the user profile information before proceeding to operation 422. As described above, the query to the advertising content server 308 from the browser 314 requesting advertisements may include document content information or a document identifier for accessing the document, as well as user information from the user profile 322.

If at operation 418, the browser 314 determines that the available supplemental information does not include advertisements, or if the user has opted out of advertisements, then the routine 400 proceeds to operation 422. At operation 422, the rendering engine 316 fluidly zooms out of the document view 104 in which none of the canvas is visible to a document view 104 in which the supplemental information area 202 of the canvas is visible. The supplemental information is rendered within the visible area of the canvas and the routine 400 ends. As described above, according to one implementation, this zooming action occurs fluidly and continuously so that there is no visible hesitation during the zooming process as the requested zoom level loads and is rendered.

Figure 5:
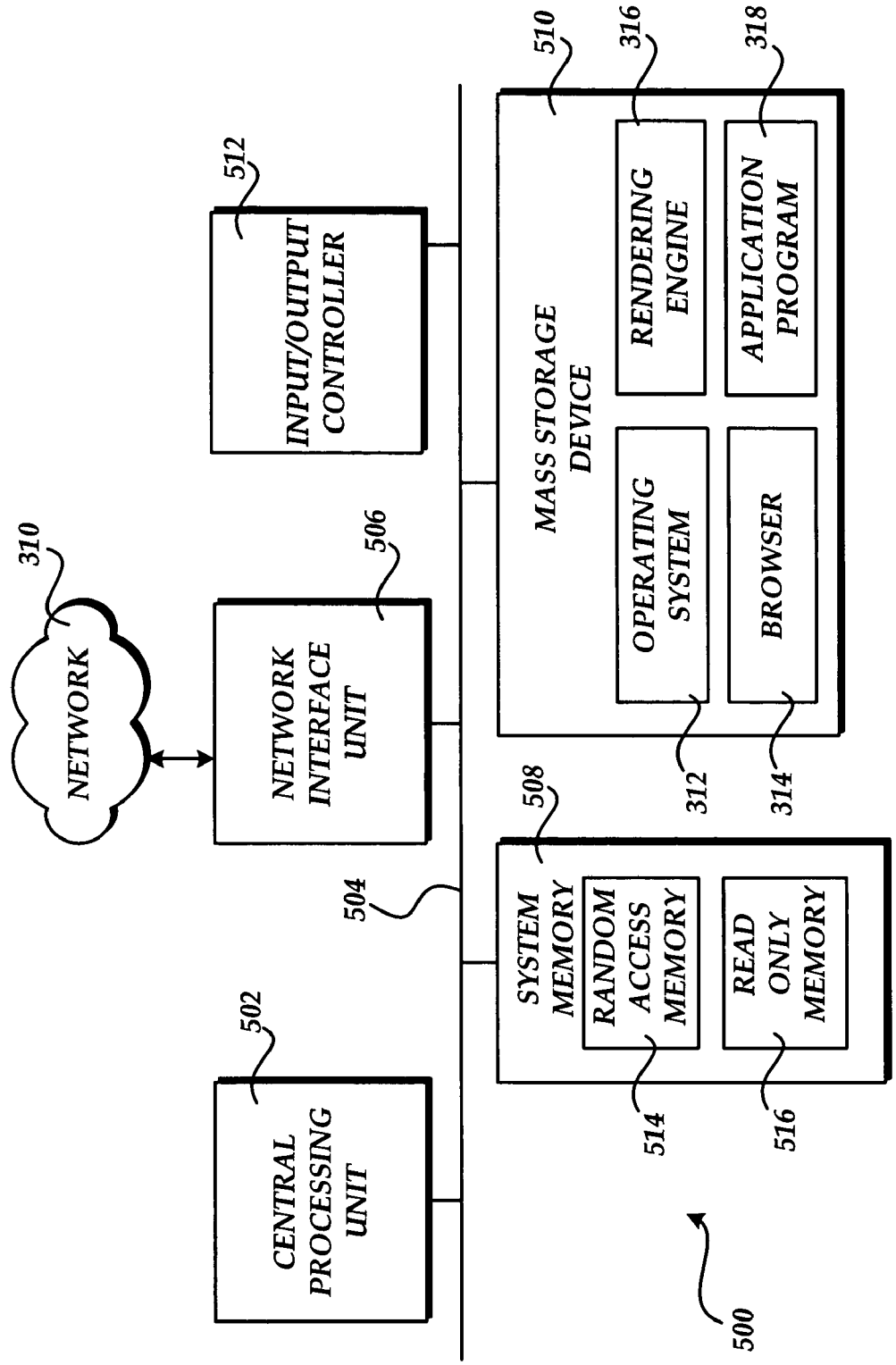
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 312 and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 310, such as the Internet. The computer 500 may connect to the network 310 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 312 suitable for controlling the operation of a networked desktop or server computer, such as the WINDOWS XP operating system from MICROSOFT CORPORATION of Redmond, Wash., or the WINDOWS VISTA operating system, also from MICROSOFT CORPORATION. The mass storage device 510 and RAM 514 may also store one or more program modules. In particular, the mass storage device 510 and the RAM 514 may store a Web browser program 314, a rendering engine 316, an application program 318, and the other program modules described above with respect to FIG. 3. Other program modules may also be stored in the mass storage device 510 and utilized by the computer 500.

Based on the foregoing, it should be appreciated that systems, methods, and computer-readable media for providing a document view with supplemental information are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for rendering a view of a document with supplemental information, the computer-implemented method comprising performing via at least one processor:
   rendering a first view of the document such that document content fills a canvas comprising an entire viewing window of a display;
   receiving a request to view a supplemental information area associated with the document;
   in response to receiving the request, fluidly zooming out of the first view to render a second view in which the document content visible in the first view is rendered in a reduced size on the canvas such that the document content visible in the first view does not fill the canvas and such that the supplemental information area is displayed on a portion of the canvas not occupied by the document content in the second view, wherein the supplemental information area is empty when the second view is rendered, and wherein fluidly zooming comprises
      executing an algorithm to extrapolate at least a third view corresponding to a view of the document content at a zoom level between a first zoom level associated with the first view and a second zoom level associated with the second view, the third view being based upon an amount of data determined based upon a resolution of the display and a difference between the first view and the second view, and
      displaying the third view between rendering the first view and rendering the second view;
   receiving supplemental information associated with the document after rendering the second view; and
   rendering the received supplemental information in the supplemental information area after rendering the second view.

2. The method of claim 1, wherein rendering the received supplemental information in the supplemental information area comprises rendering a user annotation in the portion of the canvas not occupied by the document content.

3. The method of claim 2, wherein the user annotation comprises information associated with the document that is created by a user while viewing the supplemental information area in the second view, and is accessible to the user.

4. The method of claim 1, wherein rendering the second view comprises rendering a community annotation in the portion of the canvas not occupied by the document content.

5. The method of claim 4, wherein the community annotation comprises information associated with the document that is created by a user while viewing the supplemental information area in the second view, and is accessible to one or more other users.

6. The method of claim 1, wherein rendering the second view comprises rendering an advertisement in the portion of the canvas not occupied by the document content.

7. The method of claim 1, wherein rendering the second view comprises reducing a size of the view of the document content from the size of the canvas to a size smaller than the canvas utilizing an amount of data corresponding to the document content in the reduced size that is proportional to a resolution of the display and that includes differences between a resolution of the document content filling the canvas and a resolution of the document content in the reduced size.

8. The method of claim 1, further comprising:
   receiving a request to conceal the view of the supplemental information area associated with the document; and
   in response to receiving the request, fluidly zooming into the second view and again rendering the first view of the document such that the document fills the canvas.

9. The method of claim 8, wherein rendering the first view comprises increasing a size of the view of the document content from a size smaller than the canvas to the size of the canvas utilizing an amount of data corresponding to the document content filling the canvas that is proportional to a resolution of the display and that includes differences between a resolution of the document content in the reduced size and a resolution of the document content filling the canvas.

10. The method of claim 1, wherein the document comprises a World Wide Web page.

11. The method of claim 1, wherein the document comprises a word processing document.

12. A computer-readable storage medium having computer-executable instructions stored thereon which, when executed by a computer, cause the computer to:
   render a first view of a document such that the document content fills a canvas comprising an entire viewing window of a display;
   receive a request to zoom out of the first view of the document to provide a zoomed-out view of the document;
   in response to receiving the request, fluidly zooming out of the first view to render a second view of the document such that the document content visible in the first view is rendered in a reduced size relative to the size of the document content visible in the first view, and such that the document content does not fill the canvas, and wherein fluidly zooming comprises
      executing an algorithm to extrapolate at least a third view corresponding to a view of the document content at a zoom level between a first zoom level associated with the first view and a second zoom level associated with the second view, the third view being based upon an amount of data determined based upon a resolution of the display and a difference between the first view and the second view, and
      displaying the third view between rendering the first view and rendering the second view;
   render the supplemental information area in a portion of the canvas not occupied by the document content in the second view, wherein the supplemental information area is empty when the second view is rendered;

receive supplemental information associated with the document after rendering the second view; and render the supplemental information in the supplemental information area after rendering the second view.

13. The computer-readable storage medium of claim 12, wherein the supplemental information comprises annotations associated with the document and created by a user of the computer.

14. The computer-readable storage medium of claim 12, wherein the supplemental information comprises annotations stored on a computer network.

15. The computer-readable storage medium of claim 12, further comprising computer-executable instructions that, when executed by the computer, cause the computer to receive a request to conceal the view of the supplemental information area associated with the document; and in response to receiving the request, fluidly zoom into the second view and again rendering the first view of the document such that the document fills the canvas.

16. A computer-implemented method for rendering a view of a document with supplemental information, the computer-implemented method comprising performing via at least one processor:

rendering a first view of the document such that document content fills a canvas comprising an entire viewing window of a display;

receiving a request to render a second view of the document in a reduced size on the canvas relative to the size of the document content visible in the first view;

in response to receiving the request, determining whether supplemental information corresponding to the document is stored in a computer storage device;

retrieving the supplemental information in response to determining that the supplemental information corresponding to the document is stored in the computer storage device;

fluidly zooming out of the first view to render the second view of the document, wherein in the second view of the document, the document content visible in the first view is rendered in the reduced size on the canvas such that the document content visible in the first view does not occupy the entire canvas and such that a supplemental information area is visible on the canvas in addition to the document content visible in the first view, and wherein fluidly zooming comprises executing an algorithm to extrapolate at least a third view corresponding to a view of the document content at a zoom level between a first zoom level associated with the first view and a second zoom level associated with the second view, the third view being based upon an amount of data determined based upon a resolution of the display and a difference between the first view and the second view, and displaying the third view between rendering the first view and rendering the second view;

rendering the supplemental information on the canvas in the supplemental information area;

receiving a selection of a selected area within the supplemental information area;

receiving additional supplemental information while the second view is being displayed; and rendering the received additional supplemental information within the selected area of the supplemental information area while the second view is being displayed.

17. The method of claim 16, wherein the document comprises a World Wide Web page.

18. The method of claim 16, wherein the supplemental information comprises a community annotation accessible to a plurality of users.

19. The method of claim 16, further comprising:

receiving a request to conceal the view of the supplemental information area associated with the document; and in response to receiving the request, fluidly zooming into the second view and again rendering the first view of the document such that the document fills the canvas.

20. The method of claim 16, wherein rendering the received supplemental information in the supplemental information area comprises rendering a user annotation in the portion of the canvas not occupied by the document content, and the user annotation is created by a user while viewing the supplemental information area after the second view is rendered.

* * * * *